Jan. 22, 1946.　　　W. H. WIRKLER　　　2,393,353
METHOD AND APPARATUS FOR MEDIUM HIGH FREQUENCY DIRECTION FINDERS
Filed July 19, 1943　　　6 Sheets-Sheet 1
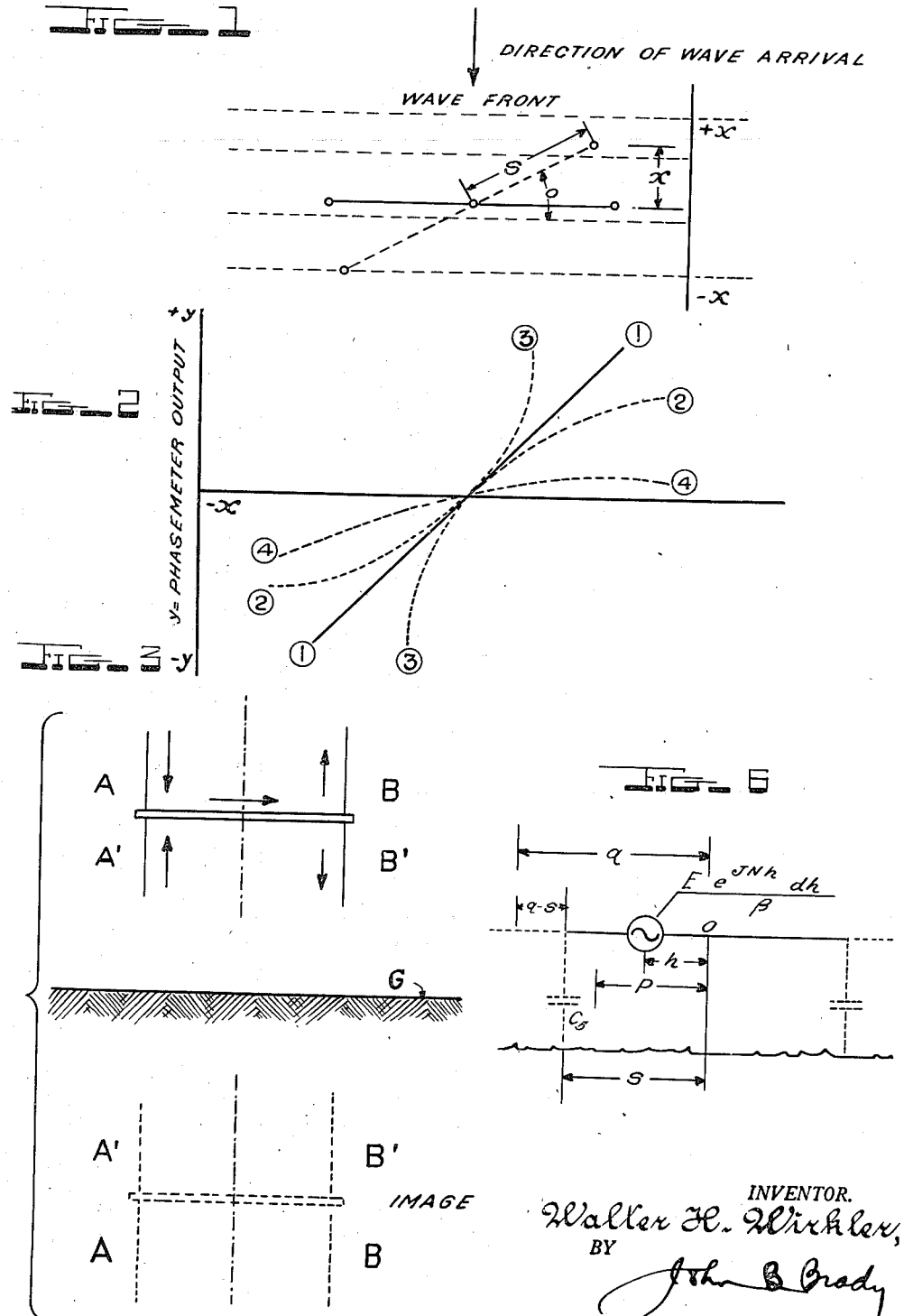
INVENTOR.
Walter H. Wirkler,
BY
John B. Brady
ATTORNEY Jan. 22, 1946.  W. H. WIRKLER  2,393,353
METHOD AND APPARATUS FOR MEDIUM HIGH FREQUENCY DIRECTION FINDERS
Filed July 19, 1943   6 Sheets-Sheet 2
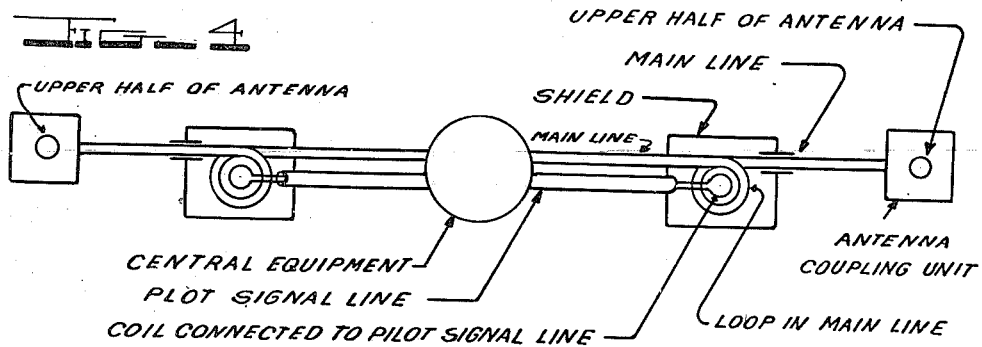
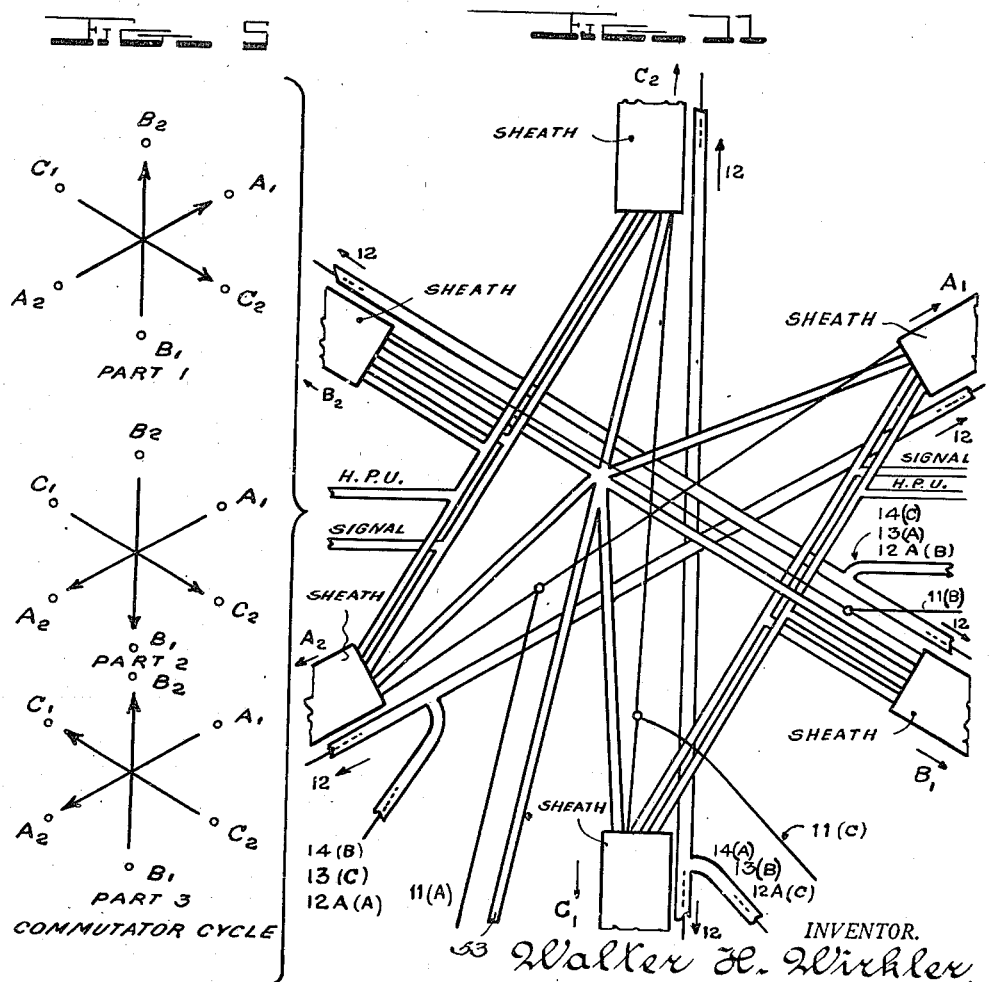
INVENTOR.
Walker H. Wirkler,
BY
John B. Brady
ATTORNEY

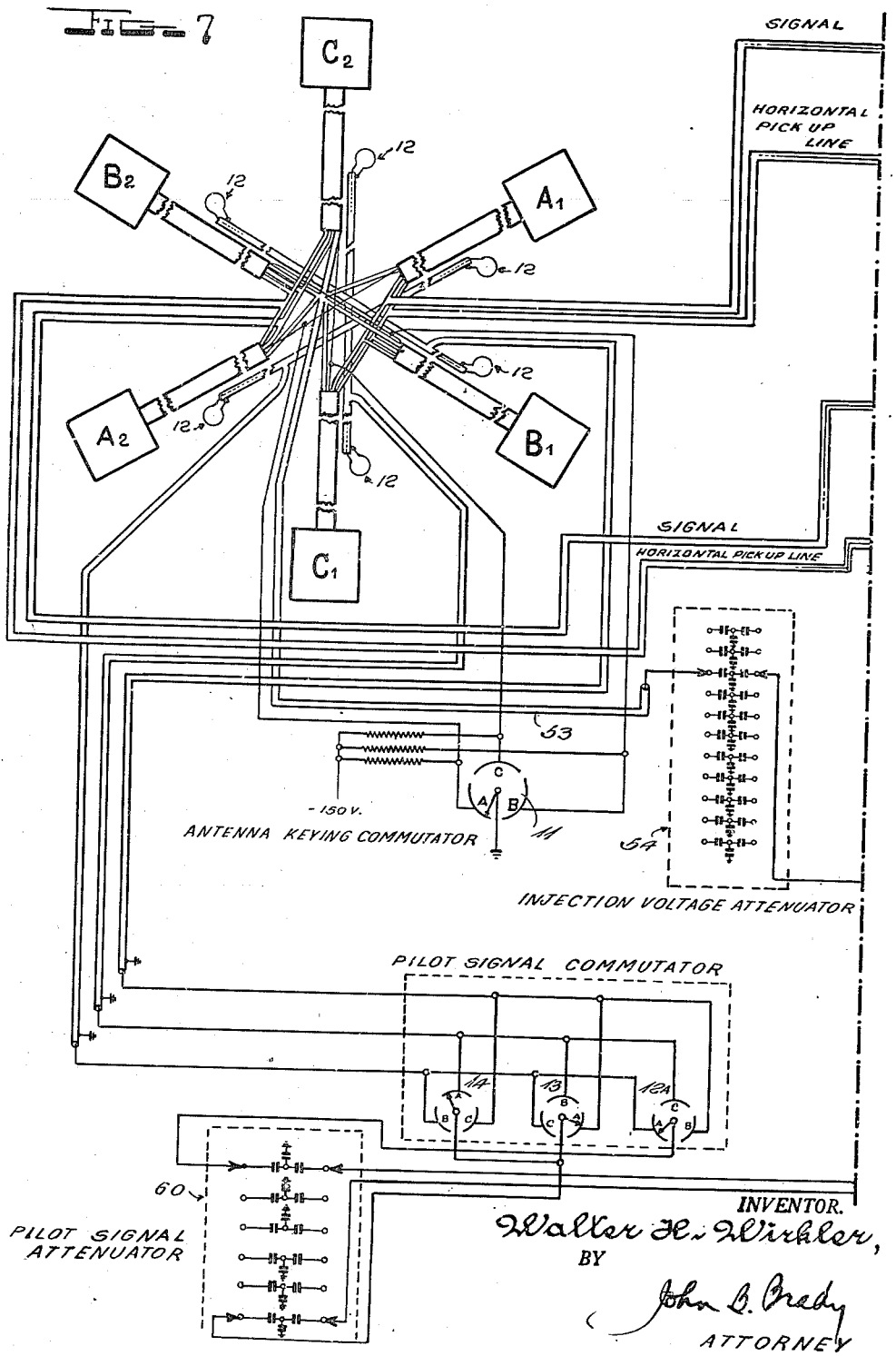

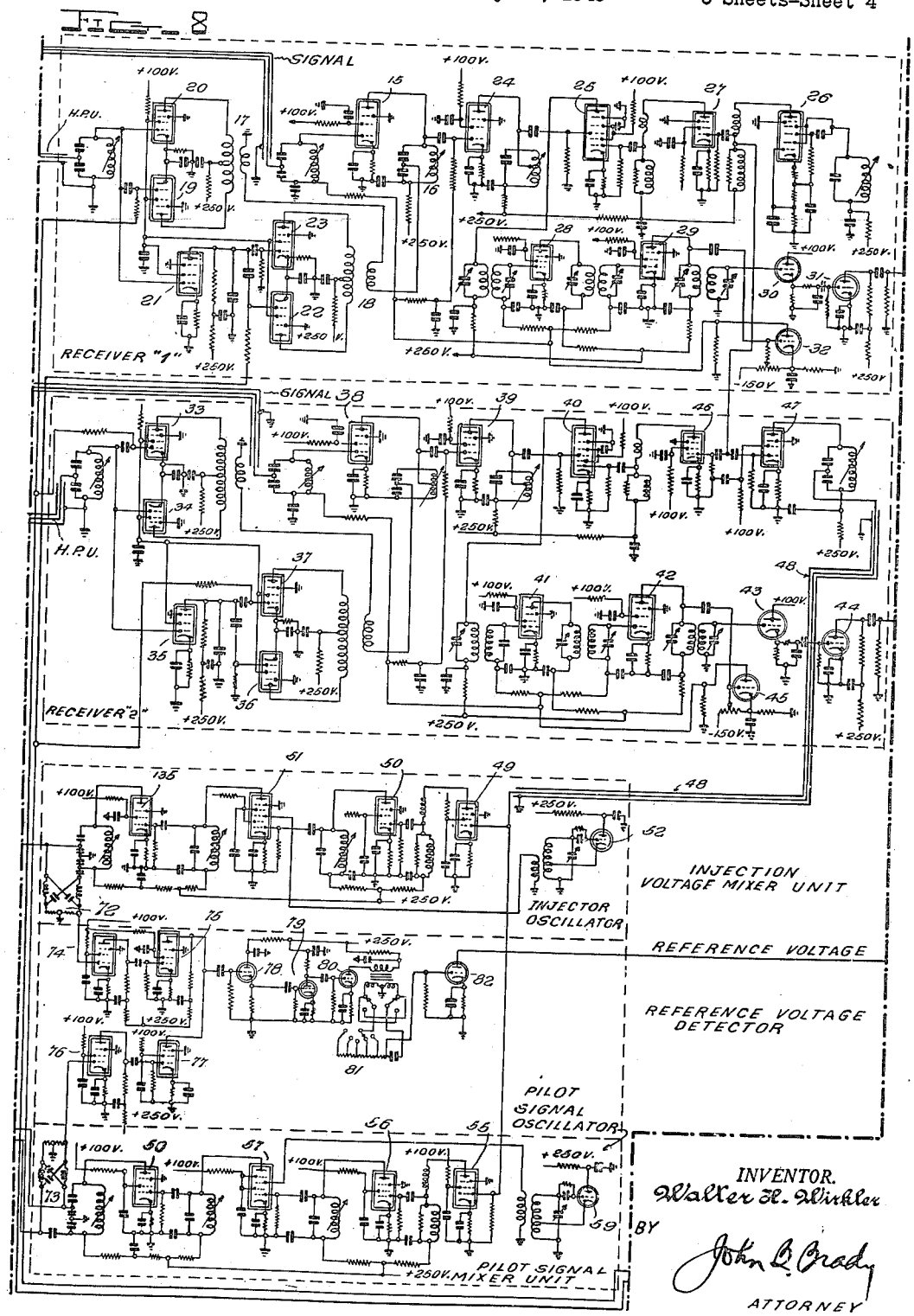

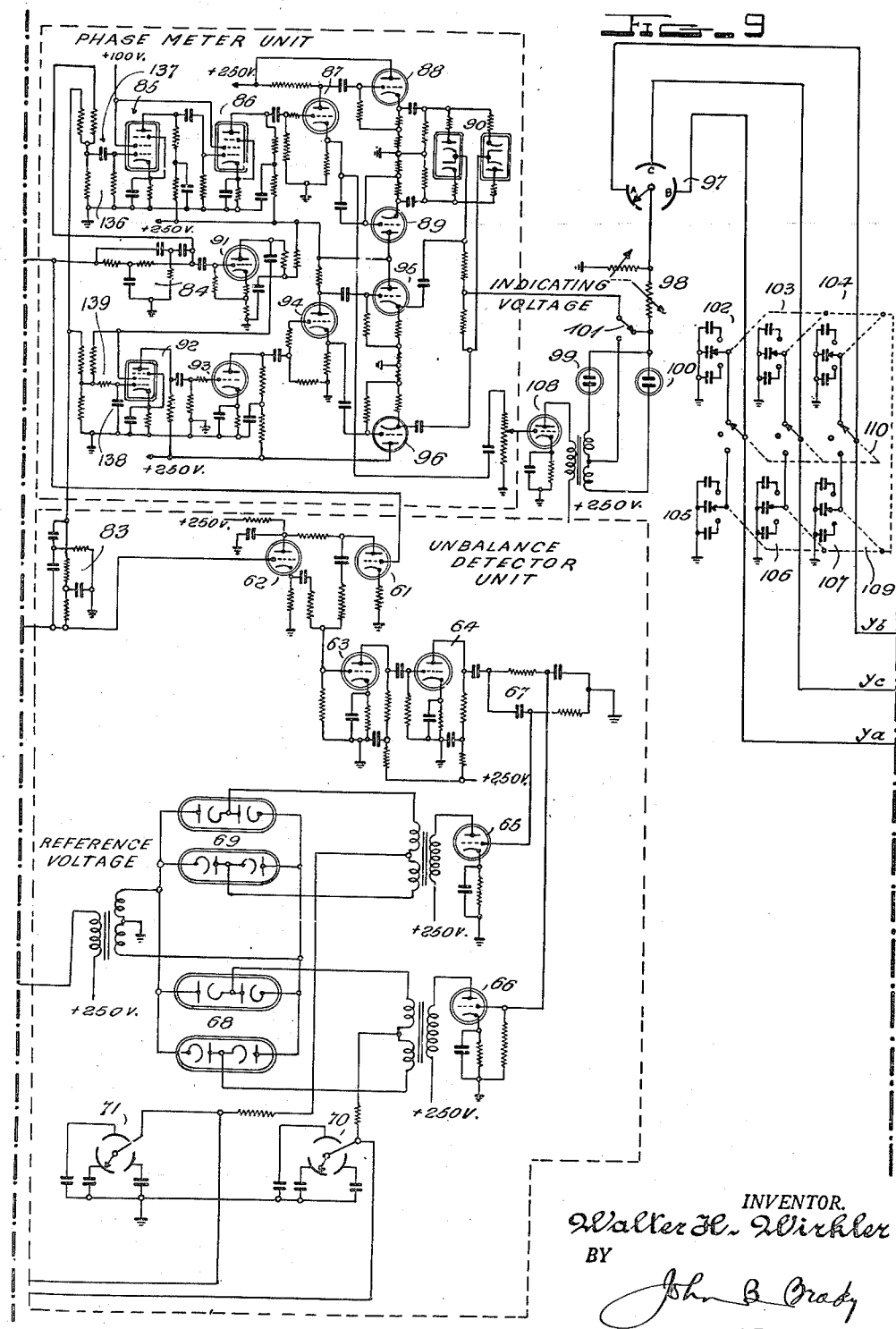

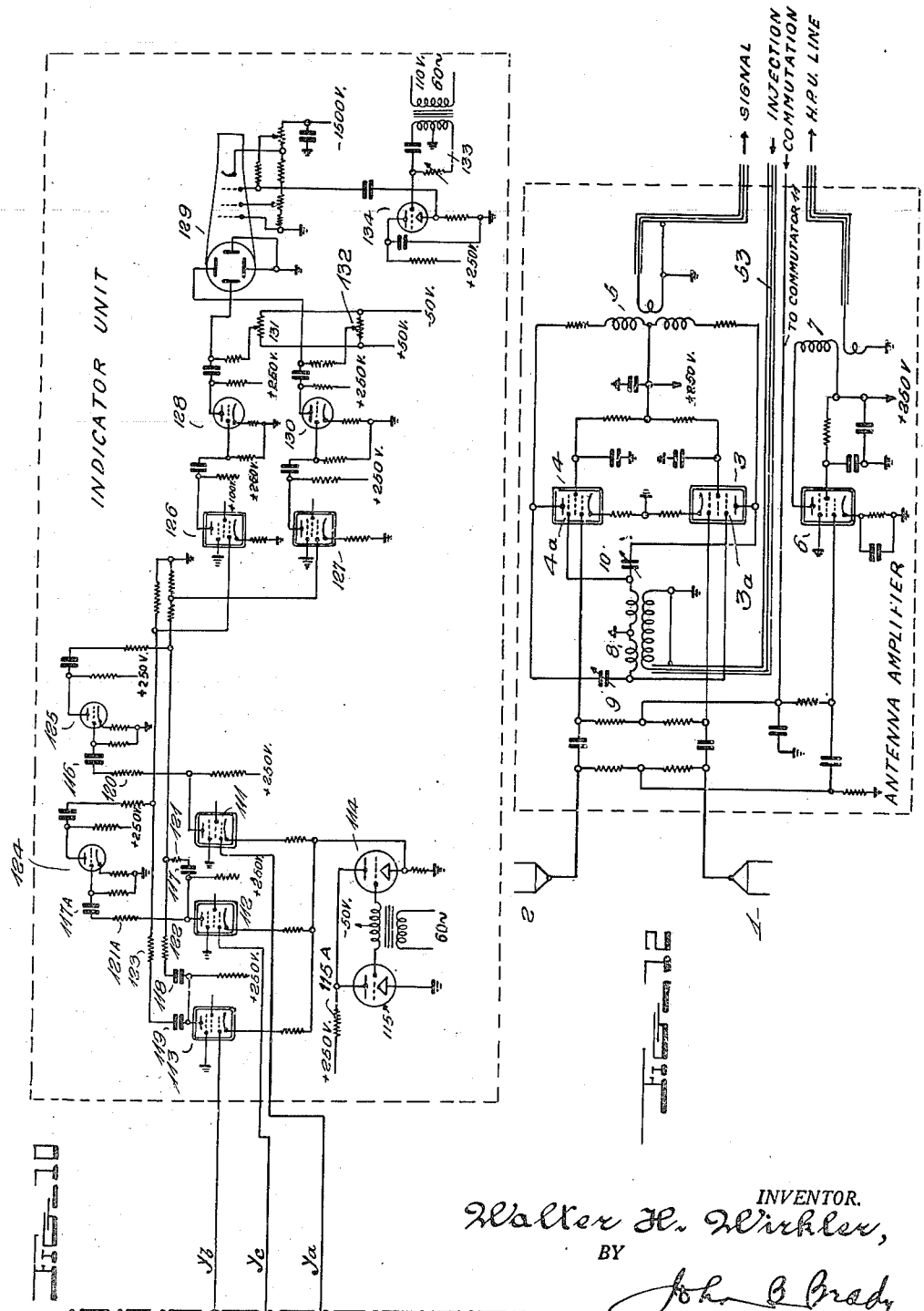

Patented Jan. 22, 1946

2,393,353

UNITED STATES PATENT OFFICE 2,393,353

METHOD AND APPARATUS FOR MEDIUM HIGH FREQUENCY DIRECTION FINDERS

Walter H. Wirkler, Cedar Rapids, Iowa, assignor to Collins Radio Company, Cedar Rapids, Iowa, a corporation of Iowa Application July 19, 1943, Serial No. 495,339

18 Claims. (Cl. 250—11)

My invention relates broadly to direction finders and more particularly to improved circuit arrangements for medium high frequency direction finders.

One of the objects of my invention is to provide an automatic balancing circuit for multiple pair antenna medium high frequency direction finder systems to substantially eliminate polarization errors.

Another object of my invention is to provide a three antenna pair system for medium high frequency direction finders in association with a pilot control signal system and an automatic balancing circuit.

Still another object of my invention is to provide an improved multiple pair antenna medium high frequency direction finder system in which errors due to diversity effect may be substantially eliminated.

A further object of my invention is the use of the heterodyne direction finder circuit in which each antenna element of a multiple pair antenna system is connected individually to a separate receiver with circuit provisions permitting the use of a single pair of receivers with three antenna pairs.

A still further object of my invention is to make available indicating voltages derived from each antenna pair of a multiple pair antenna system simultaneously for the operation of the indicating circuits.

Another object of my invention is to provide means for deriving the average or integrated value of a fluctuating bearing indication by means of integrating devices associated with each indicating voltage circuit in a multiple pair antenna system radio direction finder.

Still another object of my invention is to provide several integrating devices in each indicating voltage circuit for separately integrating bearings from several transmitters sharing time on the same frequency in a multiple pair antenna system radio direction finder.

A further object of my invention is to provide bearing indicating means actuated by the indicating voltage. In particular, circuits are provided for actuating a two-circuit cathode ray indicating device from three indicating voltages in a multiple pair antenna system radio direction finder.

A still further object of my invention is to provide marking means for the cathode ray trace to identify the sense of the indication in a multiple pair antenna system radio direction finder.

Another object of my invention is to provide an improved electronic commutating circuit arrangement for a medium high direction finder system in which a pair of receivers may be connected with three pairs of antenna systems.

Still another object of my invention is to provide commutating means for applying a pilot signal to the horizontal feeder in each antenna pair in the proper sequence for detecting antenna circuit unbalances.

Other and further objects of my invention reside in the improved balanced circuit arrangement for medium high frequency direction finders as set forth more fully in the specification hereinafter following by reference to the accompanying drawings, in which:

Figure 1 is a theoretical view used in explaining my invention; Fig. 2 is a curve diagram illustrating the characteristics incident to the diversity effect which may cause serious errors in a two pair antenna system and which is materially reduced in the three pair antenna system in my invention; Fig. 3 is a schematic diagram showing the distribution of currents in the structure comprising one pair of antenna elements and the associated feeders employed in the system of my invention; Fig. 4 is a schematic illustration showing the arrangement of one antenna pair with respect to the central equipment together with the pilot signal inducing means employed in the direction finder system of my invention; Fig. 5 is a theoretical view showing the direction of the pilot-signal excitation to the three antenna pairs during the three parts of the commutating cycle; Fig. 6 is an illustrative view of the equivalent electrical circuit of the horizontal feeder structure of one antenna pair used in calculating the distribution of pilot signal current and current induced by the horizontally polarized wave in the direction finder system of my invention; Figs. 7, 8, 9 and 10 conjointly disclose, when aligned edge to edge, the circuit arrangements for the medium high frequency direction finder system of my invention; Fig. 11 is an enlarged view of the interconnection means for the three pair antenna systems and the pilot conductors used in the system of my invention; and Fig. 12 is a diagrammatic view of the antenna amplifier employed in connection with each of the dipole antennas employed in the system of my invention.

Direction finding technique for low frequency ground waves is generally well understood because the received wave has only one component, with a constant polarization. To a large extent, this is true also of ultra-high frequency waves at short distances. At medium high frequencies beyond the range of the direct or ground wave, the conditions of polarization, vertical angle of arrival, and multipath reception are never constant and give rise to various design and operation problems which have never been very well understood. Often the errors of various kinds have been over estimated, under estimated, or ascribed to the wrong cause. The result has been much confusion and misunderstanding as to the ultimate possibilities, the design requirements, and the operating technique for direction finders in the frequency range 2 to 20 mc./sec.

My invention is directed to an accurate direction finding equipment built for this frequency range which will provide accurate bearings with low power over long distances a large percentage of the time.

In rotatable equipment of the type involving two spaced collectors, the vertical angle of arrival does not cause errors directly but does increase the effect of polarization error by decreasing the relative directional sensitivity to the normally polarized component as compared to the sensitivity to the components giving rise to polarization error. Multipath reception over several vertically-displaced paths similarly causes no error with this equipment. Multipath reception involving paths laterally displaced from each other naturally causes errors in rotatable as well as in fixed antenna equipment.

When the major component of the received energy arrives along the great circle path and a minor component arrives along a laterally-displaced path, the indicated bearing swings back and forth as the phase relation between the two waves changes. If the rotatable direction finder is oriented so that the great circle wave produces an "on-bearing" indication the weaker laterally-deviated wave may, for a particular phase relation, cause the indicated bearing to be deviated to the right. If the phase relation between the two waves now undergoes a change of 180°, the indicated bearing will be deviated to the left. If an integrating circuit is applied to the indicator, the indicated bearing will integrate to the great circle value over a period of time.

Polarization error produces a displacement of the indicated bearing from the great circle similarly dependent on the phase relation between the normally polarized component and the abnormally polarized component. The integrating circuit would eliminate polarization error just as it eliminates the effect of a minor laterally-displaced wave. Since the phase relation between the laterally-displaced wave, the abnormally-polarized wave, and the principal great circle wave is purely random, it is impossible to tell which of the two effects is responsible for the observed swinging. Since the effect of the laterally-displaced wave is beyond the control of the designer, he must design the equipment so that polarization errors are much less than the effects of lateral displacement to be certain that the swinging observed will not be confused with polarization error. Although the improvement in performance obtained by a reduction of polarization error may be masked by the lateral deviation effect so that effort expended in this direction does not seem to produce proportional returns, it is still the part of wisdom to design the equipment with an absolute minimum of polarization error.

In addition to errors of the two types mentioned above, equipment of the fixed antenna type is subject to another group of errors related to the vertical angle of arrival. The most serious of these errors is a result of interference between two or more waves arriving over vertically-displaced paths in the plane of the great circle. Hence these errors will be included under the general classification of diversity effect. In the case of interference between two vertically-displaced waves the deviation of the indicated bearing from the true bearing depends upon the phase relation between the two waves just as it does in the case of polarization error and interference between laterally-displaced waves. Although the true bearing will be obtained by integrating over a sufficiently long period of time, it is important that this diversity effect be held to a minimum because it can be at least as serious as polarization error.

While the integrating circuit averages out all of the errors mentioned above, it is still desirable to keep all errors to a minimum to reduce the time required for taking a bearing. Since it is possible that some signals will be relatively free of the secondary lateral deviation effect and yet exhibit polarization and diversity effects, the latter two must be held to a minimum. In general, however, the integrating time required to take an accurate bearing will be determined by the secondary lateral deviation effect, which is beyond the control of the designer. The best he can do in this respect is to make the integrating convenient and of adjustable time constant.

In the case of aural null direction finders, the integrating is never convenient because it involves taking a series of bearings and averaging them. This involves continuous and very tiresome swinging of the direction finder. Hence it is almost mandatory that the direction finder be of the visual indicating type, if the full advantage of integration is to be realized.

Although a rotatable direction finder of the visual indicating type is quite an improvement over the aural null direction finder from the standpoint of convenience in integrating, it is, like the aural null type, to be classed as a "hunt and guess" system in the presence of swinging signals. In other words, the operator first sets the direction finder at what he guesses to be an on-bearing heading and allows it to integrate over several swing cycles. The visual indicating circuit informs him that his azimuth is too low, so he tries a higher azimuth and waits to see what he gets. The visual indicating circuit may then tell him he is too high, and so on until he finally gets an answer that looks about right. If, however, the station has stopped sending in the meantime, when it comes on again a few seconds later he has forgotten where he was and must start all over. The long time required for taking a bearing is a result of the fact that the integrating circuit wastes its time whenever the direction finder heading is very much off-bearing and makes good use of its time only when the heading is so nearly correct that an approximate on-bearing indication is obtained.

In the case of automatic indicating equipment of the fixed-antenna type, this difficulty is not present because the apparent bearing is indicated at all times and does not depend on any follow-up action on the part of the operator. When the bearing is swinging, he may follow the indication by eye and mentally determine an integrated bearing. However, such mental integration is not very reliable because the mind is easily confused and may give undue weight to a large excursion in one direction, or to a temporary steadiness of the bearing in the wrong place.

The obvious solution to this problem is to make the equipment automatic integrating as well as automatic visual indicating, as in the design to be described. If the integrating time constant is adjustable, the direction finder can be operated normally with a low time constant for taking snap bearings on signals steady enough to permit, or on signals of such short duration that snap bearings are necessary. If the signal persists and is swinging, the time constant can be increased and a more accurate bearing obtained than could be obtained in any other way. If the direction finder is also essentially free of polarization error and diversity effect, it represents the ultimate in direction finding equipment from the standpoint of speed and accuracy, with performance limited only by natural propagation conditions. While there are times when the main component of the received wave is laterally deviated from the great circle path, much of the time the major component is on the great circle and the swinging due to minor laterally-deviated components can be integrated out.

Equipment of this type has not been built in the past partly because no fixed-antenna equipment has ever been free of diversity effect or polarization error over a wide range of frequencies, and partly because too much emphasis has been placed on "instantaneous" bearings. In other words, since polarization error and diversity effect have never been small, it has been hoped that if these effects could be eliminated, snap bearings could always be obtained. Once equipment sufficiently free of polarization error and diversity effect is available and it can be shown that swinging due to secondary lateral deviation still exists, it will be realized that optional automatic integrating circuits are a necessity for accurate work part of the time, and more attention will be given to their development. This should result in a revival of interest in medium high frequency direction finders for long range and emergency navigation purposes as well as for military intercept uses. It is believed that fast and accurate bearings will be obtained a much larger percentage of the time than is now generally thought possible.

The three major problems in the design of a fixed-antenna direction finder of optimum performance then are:

I. Reduction of diversity effect.
II. Reduction of polarization error.
III. Design of automatic indicating circuits with adjustable integrating features.

I. *Diversity effect*

Control of diversity effect has usually been attempted by reducing the spacing of the collectors. For various reasons, this results in loss of performance from the standpoint of sensitivity, tuning range, accuracy of indication, and polarization error. This method therefore will not be discussed any further.

Another proposal has been the use of horizontal loops instead of vertical dipoles as collector antennas. The chief argument for this method is that the most extreme cases of diversity effect result from interference between a high-angle sky wave and a ground wave. Since the horizontal loops are insensitive to the ground wave, this interference will be eliminated, although not so much improvement is expected for conditions of interference between two sky waves arriving at different vertical angles. It will be found, however, that at the lower frequencies there is never any appreciable vertical magnetic intensity at reasonable heights above the ground, and the sensitivity of the device will be poor. Further, pure ground wave signals will be passed over altogether. It has been found also that the vertical component of magnetic intensity which excites the horizontal loops, is adversely affected by irregularities in ground conductivity and that generally poor operation results.

From a practical standpoint, the design of such an antenna system will be rather troublesome, because loop antennas have no appreciable pickup factor unless they are tuned, and tuning introduces a variety of design problems because of ganging, mutual inductance, and phase stability considerations, especially when there are more than two collector antennas. For a practical design, then, let us revert to the vertical dipole collectors, analyze the cause of diversity effect, and see what can be done about it.

Fig. 1 shows one collector pair, with the line joining the two antennas making an angle $\theta$ with a horizontal line in the wave front. The dimension X in Fig. 1 is a measure of the distance spanned by the collector pair perpendicular to the wave front. X is considered to be positive or negative, depending on whether $\theta$ is positive or negative. In fact, $X = s \sin \theta$, where $s$ is one-half the collector spacing.

Consider a two-pair (four-collector) direction finder in which a circuit is used to produce an indicated bearing $$\theta' = \tan^{-1} \frac{y_a}{y_b}$$

where $y_a$ is a voltage derived from antenna pair A and $y_b$ is a voltage derived from antenna pair B. Pair B is erected at right angles to pair A. The indicated bearing will be accurate only if $y_a = KX_a$, and $y_b = KX_b$, since $$X_a = s \sin \theta$$

$$X_b = s \sin (90° - \theta) = s \cos \theta$$

$$\tan \theta' = \frac{y_a}{y_b} = \frac{K s \sin \theta}{K s \cos \theta} = \tan \theta$$

This requires that the derived voltage $y$ (labelled "phase-meter output") be related to X by the straight line relation 1 of Fig. 2.

Failure to realize the straight line relation between $y$ and X is a most serious source of error in fixed-collector direction finders, and is due chiefly to three causes:

1. Octant effect.
2. Diversity effect.
3. Non-linearity of indicator circuits.

The so-called octant effect is a result of the fact that the output of one antenna pair is not directly proportional to the phase difference, Z, between the voltages induced in the two collectors, but to their vector difference given by $y = 2E \sin \frac{1}{2}Z$, where E is the magnitude of the voltages induced. This relation resembles curve 2 of Fig. 2 and gives rise to octant error, so called because it has a maximum value in eight directions on the compass. Octant error is relatively small for reasonably close antenna spacings and can be calibrated out if the vertical angle of arrival is known approximately.

Diversity effect is caused by interference between two or more waves arriving at different vertical angles and is so named because it gives rise to fading cycles which are different at antennas horizontally spaced from each other. This effect has been employed in diversity receiving systems to reduce the effects of fading. It is obvious that no diversity effect can exist between antennas located in the plane of the wave front ($\theta = 0$, Fig. 1), because each of the vertically-displaced waves arrives at one antenna with the time phase at which it arrives at the other, so that the two fading cycles are synchronous. For this reason, no diversity error exists in the rotatable direction finder when on-bearing, and the diversity error when slightly off-bearing is very small.

In the fixed-collector direction finder, however, this diversity effect may give rise to $y$ vs. $X$ curves such as 2 or 3, Fig. 2, and can cause quite serious errors in the two-pair system. It is important to note that the $y$ vs. $x$ curves obtained under diversity conditions are always symmetrical about $X=0$. That is, if $X$ is made negative and positive by equal amounts the positions of the two collectors, as measured from a reference line in the wave front, are interchanged and $y$ will be positive and negative by equal amounts. Thus diversity effect can give $X$ vs. $y$ curves such as 2 or 3, Fig. 2, but never such as 4.

Non-linear indicator circuits also can give rise to any of the curves in Fig. 2. While it is comparatively easy to avoid non-symmetrical curves such as 4 by use of push-pull circuits and other circuit devices, curves such as 2 are usually more difficult to avoid.

It is found that errors caused by octant effect, diversity effect, and non-linear circuits resulting in curves such as 2 or 3, Fig. 2, can be reduced greatly if three pairs of collector antennas are used instead of two. The three pairs are erected in 120° relationship to each other and the indicator circuits arranged to give an indicated bearing $$\theta' = \tan^{-1}\frac{y_b+y_c-2y_a}{\sqrt{3}(y_b-y_c)}$$

where $y_a$, $y_b$ and $y_c$ are the indicating voltages derived from the three antenna pairs, respectively. If all three voltages obey the relation $$y = KX, \text{ as in 1, Fig. 2,}$$

$$y_a = KX_a = Ks \sin \theta$$

$$y_b = KX_b = Ks \sin(\theta - 120°) = -Ks\frac{(\sqrt{3}\cos\theta + \sin\theta)}{2}$$

$$y_c = KX_c = Ks \sin(\theta + 120°) = +Ks\frac{(\sqrt{3}\cos\theta - \sin\theta)}{2}$$

$$y_b + y_c - 2y_a = -3Ks \sin\theta$$

$$y_b - y_c = -\sqrt{3}Ks \cos\theta$$

$$\tan\theta' = \frac{y_b+y_c-2y_a}{\sqrt{3}(y_b-y_c)} = \tan\theta$$

The indication for the three-pair system is thus correct when the system obeys a linear law. It can be shown that if curves 2 and 3 can be expressed as $y=H+KX+LX^3$, where H, K, and L are arbitrary constants either positive or negative, the indication will still be correct:

$$\frac{y_b+y_c-2y_a}{\sqrt{3}(y_b-y_c)} =$$

$$\frac{K(X_b+X_c-2X_a)+L(X_b^3+X_c^3-2X_a^3)}{\sqrt{3}K(X_b-X_c)+\sqrt{3}L(X_b^3-X_c^3)}$$

$$X_a^3 = K^3s^3 \sin^3\theta$$

$$X_b^3 = -\frac{K^3s^3}{8}\left[3\sqrt{3}\cos^3\theta + 9\cos^2\theta\sin\theta + 3\sqrt{3}\cos\theta\sin^2\theta + \sin^3\theta\right]$$

$$X_c^3 = \frac{K^3s^3}{8}\left[3\sqrt{3}\cos^3\theta - 9\cos^2\theta\sin\theta + 3\sqrt{3}\cos\theta\sin^2\theta - \sin^3\theta\right]$$

$$X_b^3 + X_c^3 - 2X_a^3 = \frac{-K^3s^3}{8}[18\cos^2\theta\sin\theta + 18\sin^3\theta]$$

$$X_b^3 - X_c^3 = \frac{-K^3s^3}{8}[6\sqrt{3}\cos^3\theta + 6\sqrt{3}\cos\theta\sin^2\theta]$$

$$\frac{L(X_b^3+X_c^3-2X_a^3)}{\sqrt{3}L(X_b^3-X_c^3)} =$$

$$\frac{18\sin\theta[\cos^2\theta+\sin^2\theta]}{\sqrt{3}\cdot 6\sqrt{3}\cos\theta[\cos^2\theta+\sin^2\theta]} = \tan\theta$$

It has already been shown that $$\frac{K(X_b+X_c-2X_a)}{\sqrt{3}K(X_b-X_c)} = \tan\theta$$

Therefore, from the law of proportions, $$\tan\theta' = \frac{y_b+y_c-2y_a}{\sqrt{3}(y_b-y_c)} = \tan\theta$$

and the indication is correct.

Since, in the relation $y=H+KX+LX^3$, the constants H, K, and L are purely arbitrary, this relation will fit most curves of types 2 and 3, Fig. 2. The only requirements are that there be no even-powered terms of X, and no fifth or higher odd-powered terms. The first requirement is met by symmetry about the point $X=0$. The second requirement is essentially met in practice because, with reasonable antenna spacing, the curve will be reasonably smooth so that no fifth-powered term is required to fit the curve accurately.

It is thus seen that the use of a three-pair collector system cancels out practically all of the octant error, diversity effect, and error due to non-linearity which is present with the two-pair system, and the additional equipment required is well justified.

II. *Polarization error*

Polarization error is caused by the fact that the relation between voltages induced in the various collectors changes with changes in polarization. In a direction finder designed to operate from the vertically-polarized component, it is not essential that the collectors pick up no horizontally-polarized component, for example, but only that they have equal sensitivity, in magnitude and sense, whatever the state of polarization. This is the case in the spaced vertical loop rotatable direction finder in which the two loops are sensitive to both vertically and horizontally polarized waves arriving from certain directions, but, since the loops are in parallel planes, the relation between the vertical and horizontal pick-up factors is the same in the two loops.

For fixed-collector direction finders, however, non-directional collectors are more desirable. Of these, the vertical dipole is sensitive to the vertical component of electric intensity, and the horizontal loop is sensitive to the vertical component of magnetic intensity. In both cases, if the geometry of the installation is reasonably exact, the principal polarization error results from unwanted voltages induced in the horizontal feeders getting into the system through antenna unbalance or re-radiation. It would seem at first thought that the horizontal loop system might be inherently free of polarization error because the feeders pick up the same voltage the loops do. This is not the case, however, because the feeder sheath, considered as a single conductor, is sensitive to the vertical, or parallelly-polarized component of E from a wave arriving at a high angle. The direction of arrival is such that one collector pair is in the plane of the wave front and, to produce a proper indication, should have no output. However, current flows on the sheath of the feeders of the other pair as a result of the vertically-polarized component of a high-angle wave. This current is strongly coupled to the collectors of the first pair in such sense as to be additive in the output circuit, and a large polarization error results.

In the case of the buried U type of vertical antenna system, polarization error is entirely a function of ground conductivity. A horizontally-polarized wave will set up earth currents at right angles to the direction of wave travel. If the soil is of finite conductivity, the vertical component of magnetic flux will penetrate some distance into the soil. The horizontal voltage induced by this flux is just equal to the voltage drop in the soil if the soil is sufficiently uniform over a large area about the direction finder site. If the discontinuity in soil conductivity presented by the feeders themselves can be neglected, there will then be no horizontal voltage gradient in the soil and consequently no polarization error. If the soil is not uniform, however, or if it is of low conductivity so that the feeders introduce an appreciable discontinuity, a ground screen or a small system of radial wires is usually ineffective because the balance between induced voltage and voltage drop in the soil is upset by the ground screen itself, unless it is a solid screen of, say, hardware cloth of very great extent, so that the current flowing in it near the direction finder site has no relation to the current flowing into it from the soil at its outer edges. Long buried feeder extensions are sometimes used instead of the complete screen for economic reasons. The system is practical only for certain permanent installations where the feeders can be buried deeply in uniform soil of high conductivity.

The elevated balanced collector system of Fig. 3 is preferred from the standpoint of ease of erection, high pick-up factor with untuned antennas, and sensitivity over a wide tuning range, provided it can be erected close to the ground and yet made free of polarization error. The principal cause of polarization error in vertical collectors of the balanced elevated type is the induction of current in the feeder sheath by the horizontally-polarized component. This sheath current gets into the antenna system either through capacity unbalance between the upper and lower limbs of the antenna, or by re-radiation and reflection from the ground as shown in Fig. 3.

If antenna unbalance were the only source of polarization error, it would be possible to eliminate this effect by balancing the antenna. Inserting series capacity in the lower limb should provide a balance because, if the antenna is reasonably short, it will act as a constant capacitance over a wide frequency range. Many experimenters, on finding that a perfect balance cannot be obtained and that the balance does not hold over a wide frequency range, have concluded that the antenna has, in spite of its short length, a resistive and reactive component depending on frequency in a very complicated way. Actually, the trouble is probably caused by the fact that the mutual impedance between antennas depends strongly on their height above ground. Thus, the currents in A and A', of Fig. 3, for example, even though equal, will not result in equal induction into the antenna B—B' considered as a whole, and therefore will not balance out, because the mutual impedance between A and B—B' is different from that between A' and B—B', since A is further from the ground than is A'. Alternatively, this effect could be deduced from the theory of images as illustrated in Fig. 3, by considering the effect of current in the images inducing unequal voltages into the two antenna circuits. Either theory would explain why the elevation of the system above ground must be much greater than that dictated by consideration of capacity unbalance before a marked reduction in polarization error is achieved.

It would be desirable if the collector system could be erected comparatively near the ground. This would simplify the structure, make possible more speedy erection, and provide security against observation. An additional advantage of erection near the ground is the substantially lower intensity of horizontally-polarized components. For these reasons, and to reduce polarization error more than has been done in the past, an automatic balancing circuit, as described below, is recommended.

In the automatic balancing circuit, a pilot signal is induced longitudinally into the sheath of each horizontal feeder. If an unbalance exists, or if sheath current is coupled into the antenna system in any way, the pilot signal will be heard in the receiver output and can be utilized to actuate automatic balancing circuits which will neutralize this undesired coupling.

Fig. 4 shows how the pilot signal excites the main horizontal line longitudinally by means of a coil coupled to a portion of the main line formed into a horizontal loop. Coil and loop are surrounded by a shield box to eliminate direct induction of the pilot signal into the antenna circuit, but the main line leaves the shield box through an insulating grommet to permit induction of the pilot signal longitudinally.

Before proceeding with the design details of the automatic balancing circuit, let us analyze the necessary conditions under which it is capable of reducing polarization error. These conditions are:

I. That there be no other cause of polarization error than the effect of currents in the horizontal feeder sheath set up by the horizontally-polarized field.

II. That the pilot-signal current flowing in the sheath have the same coupling into the signal line through the antenna system as does the current set up in the sheath by the horizontally-polarized field.

Condition I is necessary because the automatic balancing circuit is not effective in reducing polarization error due to current induced by the horizontally-polarized field anywhere except in the feeder sheath to which pilot signal is also applied. Condition I will be violated if, for example, there is a power circuit or other wires or equipment of appreciable horizontal dimensions near the antenna system in which current is induced by the horizontally-polarized field and can in turn induce a voltage into the antenna system. Condition I would also be violated if the vertical antennas were not plumb, so that the horizontally-polarized field could induce a voltage directly into the antennas.

The requirements for condition I are similar to those for other types of direction finders except the buried U type of vertical antenna system. For example, power lines can be brought into the equipment by burying them to a sufficient depth if the soil is of reasonably high conductivity. Alternatively, the power line may be in shielded cable laid on the ground radially with the shield connected to ground rods at intervals, and with radial wires, similarly connected to ground rods, laid on the ground to maintain symmetry. Six radial wires are required, counting the power line as one. The requirements are not, of course, as severe as for the buried U type direction finder, in which the horizontal potential gradient in the soil gets directly into the antenna circuit. Instead, it is necessary only to guard against the field induced into the antenna circuit by current in the power line set up by the horizontally-polarized field. The requirements in this respect are similar to those for the spaced vertical loop rotatable direction finder installed near the ground. However, because the direction finder under discussion lends itself readily to semi-portable design, these requirements should receive more attention, inasmuch as sites with sandy or rocky soil will be encountered and it may not always be feasible to dig a trench for the power cable even when the soil is of high conductivity. In some applications, it may be desirable to operate from batteries or an engine-driven generator and dispense with power and communication circuits entirely.

Condition II is necessary because the action of the automatic balancing circuit is only to neutralize the coupling of pilot-signal current into the antenna system, and it is necessary that this action also result in neutralizing the coupling of the current set up by the horizontally-polarized field. This means, essentially, that the current on the horizontal feeder sheath set up by the pilot-signal induction must vary along the sheath in exactly the same way as does the current set up by induction from the horizontally-polarized field, because the current anywhere along the length of the sheath is capable of inducing a voltage into the antenna circuit, while only that at the outer end of the sheath is impressed upon tube circuit 6 of Fig. 12 and transmitted to the automatic balancing circuit.

It is found, however, that the principal difference in the shape of the current distribution curves for the pilot-signal current with lumped induction, as in Fig. 4, and the current resulting from uniform induction by the horizontally-polarized field lies in the ratio of $I_o$, the current at the center, to $I_s$, the current at the end of the feeder sheath. In other words, if $$\frac{I_o}{I_s}$$

is the same for lumped induction as it is for uniform induction, the two curves will be similar throughout their length, both being approximately sinusoidal in shape, with maximum current at the center.

In Fig. 6 the horizontal sheath is represented as a uniform line with characteristic impedance $Z_0$ and length $s$. $C_s$ is the end capacitance consisting of the vertical antenna and the antenna coupling circuits, and $a-s$ is the equivalent length of line with open-circuit reactance equal to that of $C_s$. Hence $a-s=\tan^{-1}Z_0\omega C_s$, where $\omega$ is the cyclic frequency.

The voltage induced longitudinally by the horizontally-polarized field at a point $h$ is given by $Ee^{JN\beta h}dh$, where $E$ is the horizontally-polarized field intensity in volts per meter, $$\beta = \frac{2\pi}{\lambda}$$

where $\lambda$ is the wavelength in meters, $h$ is in meters, and $N=\sin\theta$, where $\theta$ is the angle between the axis of the line and the wave front, as in Fig. 1. If $h$ is given in radians, the induction will be $$\frac{Ee^{JNh}}{\beta}dh$$

With all distances in radians, the current at $h$ due to the induction at $h$ is $$di_h = \frac{Ee^{JNh}dh}{J\beta Z_0 [\tan h - \cot (a-h)]}$$

Neglecting the resistance and radiation resistance of the line, the current at $p$ due to the induction at $h$ is $$di_p = \frac{\sin (a-p)}{\sin (a-h)} di_h, \text{ for } h < p$$

and is $$di_p = \frac{\cos p}{\cos h} di_h \text{ for } h > p$$

The total current at $p$ is then $$I_p = \int_{h=0}^{h=p} \frac{\sin (a-p)}{\sin (a-h)} di_h + \int_{h=p}^{h=s} \frac{\cos p}{\cos h} di_h$$

This becomes $$I_p = \frac{E \sin (a-p)}{J\beta Z_0} \int_0^p \frac{e^{JNh}}{\sin (a-h)[\tan h - \cot (a-h)]} dh + \frac{E \cos p}{J\beta Z_0} \int_p^s \frac{e^{JNh}}{\cos h [\tan h - \cot (a-h)]} dh$$

which reduces to $$I_p = \frac{JE \sin (a-p)}{\beta Z_0 \cos a} \int_0^p \cos h\, e^{JNh} dh + \frac{JE \cos p}{\beta Z_0 \cos a} \int_p^s \sin (a-h)\, e^{JNh} dh$$

On evaluating the integral, we have $$I_p = \frac{JE}{\beta Z_0} \left[ \frac{\cos p \tan a}{2} \left[ \frac{\sin (1-N)s}{1-N} + \frac{\sin (1+N)s}{1+N} \right] - \cos p \left[ \frac{\sin \frac{(1-N)(s+p)}{2} \sin \frac{(1-N)(s-p)}{2}}{1-N} \right] \right.$$
$$+ \frac{\cos p}{2} \left[ \frac{\cos (1+N)s - \cos (1+n)p}{1+N} \right] - \frac{\sin p}{2} \left[ \frac{\sin (1-N)p}{1-N} + \frac{\sin (1+N)p}{1+N} \right]$$
$$+ J\frac{\sin (a-p)}{\cos a} \left[ \frac{\sin^2 \frac{(N-1)}{2}p}{N-1} + \frac{1}{2(n+1)} \right] + J\frac{\sin p}{2} \frac{\cos (N+1)p}{n+1}$$
$$+ J \tan a \cos p \left[ \frac{\sin \frac{(N-1)(s+p)}{2} \sin \frac{(N-1)(s-p)}{2}}{N-1} \right] - J\frac{\tan a \cos p}{2} \frac{\cos (N+1)s}{N+1}$$
$$\left. - J\frac{\cos p}{2} \left[ \frac{\sin (1-N)p - \sin (1-N)s}{1-N} - \frac{\sin (1+N)p - \sin (1+N)s}{1+N} \right] \right]$$

This rather elaborate expression for $I_p$ can be simplified if we make use of the fact that any effect which is symmetrical with respect to $X$, Fig. 1, causes no error in the three-pair direction finder. Thus, since $$e^{JNh} = \cos Nh + J \sin Nh$$

and $$e^{-JNh} = \cos Nh - J \sin Nh$$

the sin terms reverse sign when $N$ reverses sign, and $N$ reverses sign when $\theta$ and $X$ of Fig. 1 reverse sign. Thus we may drop these terms, which results in dropping the last five terms in the expression for $I_p$. Evaluating the remaining terms at $p=o$ and $p=s$, we can write $$\frac{I_o}{I_s} = \frac{\frac{\tan a}{2}\left[\frac{\sin(1-N)s}{1-N} + \frac{\sin(1+N)s}{1+N}\right] + \frac{1}{2}\left[\frac{\cos(1+N)s}{1+N} - \frac{2\sin^2 \frac{1}{2}(1-N)s}{1-N} - \frac{1}{1+N}\right]}{\frac{\sin(a-s)}{2\cos a}\left[\frac{\sin(1-N)s}{1-N} + \frac{\sin(1+N)s}{1+N}\right]}$$

which may be written $$\frac{I_o}{I_s} = \frac{\tan a - F}{\tan a \cos s - \sin s}$$

where $$F = \frac{\frac{2 \sin 2\frac{1}{2}(1-N)s}{1-N} + \frac{1}{1+N} - \frac{\cos(1+N)s}{1+N}}{\frac{\sin(1+N)s}{1+N} + \frac{\sin(1-N)s}{1-N}}$$

For convenience, we shall evaluate, $F_0$, $F_{\frac{1}{2}}$, and $F_1$, in which $F_0$ is $F$ for $N=0$, $\theta=0$
$F_{\frac{1}{2}}$ is $F$ for $N=\frac{1}{2}$, $\theta=30°$ and $F_1$ is $F$ for $N=1$, $\theta=90°$ This becomes $$F_0 = \tan \frac{s}{2}$$

$$F_{\frac{1}{2}} = \frac{1 - \cos \frac{3}{2}s + 6 \sin^2 \frac{s}{4}}{\sin \frac{3}{2}s + 3 \sin \frac{1}{2}s}$$

and $$F_1 = \frac{1 - \cos 2s}{\sin 2s + 2s}$$

We wish to compare $$\frac{I_o}{I_s}$$

obtained with induction from the horizontally-polarized field with $$\frac{I_o'}{I_s'}$$

obtained with lumped induction at the point $$h = \frac{s}{2}$$

as in Fig. 6. For this condition, $$\frac{I_o'}{I_h'} = \frac{1}{\cos h}$$

$$\frac{I_h'}{I_s'} = \frac{\sin(a-h)}{\sin(a-s)}$$

$$\frac{I_o'}{I_s'} = \frac{\sin(a-h)}{\cos h \sin(a-s)}$$

since $$h = \frac{s}{2}$$

this becomes $$\frac{I_o'}{I_s'} = \frac{\sin a \cos \frac{s}{2} - \cos a \sin \frac{s}{2}}{\cos \frac{s}{2}(\sin a \cos s - \cos a \sin s)}$$

$$\frac{I_o'}{I_s'} = \frac{\tan a - \tan \frac{s}{2}}{\tan a \cos s - \sin s}$$

which is the same as $$\frac{I_o}{I_s}$$

for $N=0$, showing that the significant part of the current ratio is the same for distributed induction when $\theta$ is zero as it is for lumped induction half way out on the line.

It remains but to investigate how $$\frac{I_o}{I_s}$$

changes as $\theta$ varies. For a line 3 meters from center to end; that is, 6 meters between dipoles of one pair, with the characteristic impedance of the longitudinal line 400 ohms and $C_s$ equal to 15 mmf., the calculated values of $$\frac{I_o}{I_s}$$

for several frequencies are given in the table below:

| Freq., mc./sec. | $N$ | $F$ | $\frac{I_o}{I_s}$ | $s$ | $\theta$ |
|---|---|---|---|---|---|
|  |  |  |  | Degrees | Degrees |
| 5 | 0 | 0.158 | 1.84 | 18 | 0 |
| 5 | ½ | 0.158 | 1.84 | 18 | 30 |
| 5 | 1 | 0.157 | 1.85 | 18 | 90 |
| 10 | 0 | 0.325 | 1.860 | 36 | 0 |
| 10 | ½ | 0.322 | 1.865 | 36 | 30 |
| 10 | 1 | 0.313 | 1.878 | 36 | 90 |
| 20 | 0 | .727 | 1.967 | 72 | 0 |
| 20 | ½ | .693 | 1.94 | 72 | 30 |
| 20 | 1 | .583 | 1.88 | 72 | 90 |

It will be noticed that the variation in $$\frac{I_o}{I_s}$$

is comparatively small, particularly for the lower frequencies at which a small amount of spurious pick up causes a relatively large bearing error. Further, the ratio changes appreciably only for values of $\theta$ approaching 90°, under which condition the horizontally-polarized field does not induce very much voltage into the feeder. Also the output of the particular collector pair oriented 90° from the wave front has comparatively little effect on the indicated bearing, all of which may be considered a fortuitous set of circumstances.

The reason $F$ is so nearly independent of $N$, despite the different form of the equations for $F_1$ and $F_0$, for example, becomes apparent from the following considerations:

$$F_1 = \frac{1 - \cos 2s}{\sin 2s + 2s}$$

Writing the series expansion for the sine and cosine functions, and using $2s=L$, we have $$\frac{1 - \cos L}{L + \sin L} = \frac{\frac{L^2}{2} - \frac{L^4}{24} + \frac{L^6}{720} + \cdots}{2L - \frac{L^3}{6} + \frac{L^5}{120}} = \frac{L}{4}\left[1 - \frac{L^4}{720} + \cdots\right]$$

or $$F_1 = \frac{s}{2}\left[1 - \frac{s^4}{45} + \cdots\right]$$

For small values of $s$, corresponding to the lower frequencies, it is seen that $F_1$ is very nearly $$\frac{s}{2}$$

Comparing this with $$F_0 = \tan \frac{s}{2}$$

it is seen that $F$ is very nearly the same for $N=0$ and $N=1$. For high frequencies, $F$ is more dependent on $N$, but $$\frac{I_o}{I_e}$$

is more independent of $F$. When the equivalent length of line, including the capacity loading at the end, is a quarter wave, $a$ becomes ninety degrees and $$\frac{I_o}{I_e} = \frac{\tan a - F}{\tan a \cos s - \sin s}$$

becomes $$\frac{I_o}{I_e} = \frac{1}{\cos s}$$

independent of $F$.

From the analysis above it appears that the automatic balancing circuit is quite effective in balancing antenna pick up in one antenna pair due to current induced in the feeder sheath of that pair by the horizontally-polarized field. For current induced in the sheath by a high-angle vertically-polarized field, the action of the automatic balancing circuit will not be quite so effective, because maximum induction takes place when $\theta=90°$ and $N=1$. Fortunately, however, this effect balances out in the three-pair direction finder, because the induction reverses sign as $\theta$ reverses sign, so that the output of the antenna pair due to this effect is symmetrical with respect to X, Fig. 1.

The effect of current in the feeder sheath of one pair on the antenna circuits of the other two pairs can be made to balance out also. From the equation for the indicated bearing, $$\theta' = \tan^{-1}\frac{y_b + y_c - 2y_a}{\sqrt{3}(y_b - y_c)}$$

it can be seen that if the current in the feeder sheath of pair $a$, for example, resulted in a fixed increment for the outputs, $y_b$ and $y_c$, of the other of the other two pairs, there would be no effect in the denominator, but in the numerator the effect on the indicated bearing would be the same as though $y_b$ and $y_c$ were not changed but $y_a$ suffered a corresponding negative increment, which would result in polarization error. To compensate for this effect, it will be necessary, in connection with the antenna commutating scheme (Fig. 7) to be described later, to apply pilot signal to pairs B and C as well as A while the automatic balancing circuit in A is energized, with the pilot signal excitation of B and C properly poled with respect to that of A.

The foregoing detailed analysis has been necessary first, to satisfy us that the three-pair collector system eliminates virtually all of the diversity effect found in the two-pair system and, second, that the automatic balancing circuit can be made to eliminate practically all of the polarization error found in the elevated balanced-dipole system. It remains still to investigate the problems connected with the design of visual indicating, integrating, and automatic balancing circuits in a practical installation.

It will be noticed that there is only one pair of receivers and one phasemeter circuit, and it can be seen from Fig. 7 that only one antenna pair is effective at any time. Aside from the saving in equipment, the advantage of this arrangement is that the outputs of the three antenna pairs are treated exactly alike. In other words, in the relations of Fig. 2, $$y_a = H_a + K_a X_a + L_a X_a^3,$$
$$y_b = H_b + K_b X_b + L_b X_b^3, \text{ and}$$
$$y_c = H_c + K_c X_c + L_c X_c^3,$$

and the condition $H_a = H_b = H_c$, $K_a = K_b = K_c$, and $L_a = L_b = L_c$ is assured, because the constants H, K and L are determined by the gain and phase shift characteristics of the receiver and phasemeter circuits which are common to all three antenna pairs.

Since the indicator circuit must be energized simultaneously by the voltages $y_a$, $y_b$ and $y_c$, it is necessary that these voltages be stored over a commutating cycle. This is accomplished by means of the three condensers connected to the commutating switch in the phasemeter output circuit of Fig. 9. Each condenser is continuously connected to the grid of a tube in its particular branch, A, B or C, (Fig. 9) of the indicator circuit. Each condenser is connected to the phasemeter output circuit during the portion of the cycle that its particular antenna pair A, B or C, (Fig. 7) is energized. The commutating rate, 10 to 20 C. P. S., is sufficiently high so that the charge on the condensers reaches its ambient value after a few cycles, and a steady indication is obtained.

The condensers also serve the purpose of integrating a swinging bearing. It is found that if each of the voltages, $y_a$, $y_b$ and $y_c$ is integrated separately, the integrated bearing will be indicated. Instead of a single condenser, each of the three filters in Fig. 9 consists of a group of condensers of different capacitance so that the capacitance of each group can be adjusted simultaneously by means of a gang-operated switch.

When taking a bearing on a telegraph signal with the smaller values of filter condenser, it will be found that the bearing indication gradually disappears as the charge on the condensers leaks off. An optional circuit is provided in the phasemeter to key the indicating voltage. This is accomplished by means of a pair of neon tubes effectively in series with the D.-C. phasemeter output circuit, so arranged that the tubes are ignited by the audio signal voltage. The filter condensers are thus effectively disconnected from the phasemeter output circuit in the absence of signal, permitting them to retain their charge and maintain the indication.

The function of the indicator circuit is merely to apply the three voltages to an indicator unit in directions 120° apart. Thus, if $\bar{i}$ is a horizontal unit vector and $\bar{j}$ is a vertical unit vector, let $\bar{r}$, $\bar{s}$ and $\bar{t}$ be vectors 120° displaced from $\bar{i}$. Thus, $$\bar{r} = -2\bar{i} + \bar{j}0$$
$$\bar{s} = +\bar{i} + \bar{j}\sqrt{3}$$
$$\bar{t} = +\bar{i} - \bar{j}\sqrt{3}$$

If we now apply $y_a$ in the direction of $\bar{r}$, $y_b$ in the direction of $\bar{s}$, and $y_c$ in the direction of $\bar{t}$, we have, $$y_a\bar{r} = -2y_a\bar{i}$$
$$y_b\bar{s} = y_b\bar{i} + \sqrt{3}y_b\bar{j}$$

and $$y_c\bar{t} = y_c\bar{i} - \sqrt{3}y_c\bar{j}$$

The net field, $y_a\vec{r}+y_b\vec{s}+y_c\vec{t}$, then is
$(y_b+y_c-2y_a)\vec{i}+\sqrt{3}(y_b-y_c)\vec{j}$, the ratio of the horizontal to the vertical component of this field is thus $$\frac{y_b=y_c-2\ y_a}{\sqrt{3}\ (y_b-y_c)}$$

which is equal to tan $\theta'$. In other words the direction of the field is the indicated angle $\theta'$.

Fig. 10 shows the circuit of my invention in which an A. C. voltage is obtained from each of three vacuum tube voltmeters proportional to the D. C. voltage applied to its grid. By means of a circuit similar to a "Scott connection," two A. C. voltages in phase with each other with amplitudes respectively proportional to $y_b+y_c-2y_a$ and $\sqrt{3}(y_b-y_c)$ are obtained and applied to the two sets of plates of a conventional cathode ray tube. A third A. C. voltage is employed to defocus the tube at one point in the A. C. cycle. The resultant indication is a straight line pointed to the indicated bearing, with the defocused spot making a tail for the arrow, thus indicating sense. By the use of suitable feedback circuits, this indicator is made stable and independent of tube characteristics. The details of the circuit arrangements of my invention are described more fully hereinafter.

The six antennas of the three-pair direction finder are arranged as in the upper-left portion of the drawing, shown at Fig. 7. A1, A2, B1, B2, C1 and C2 each indicate a dipole antenna with associated amplifiers as illustrated in detail in Fig. 12. In Fig. 12, elements 1 and 2 are the lower and upper halves of the dipole, 3 and 4 are the tubes of the untuned push-pull signal amplifier coupled to the signal line by transformer 5. Amplifier 3—4 is connected to the dipole antenna in push-pull so as to amplify the signal voltage set up in the antenna by the vertically-polarized component of the signal field. Tube 6 is a horizontal pick-up amplifier connected to the mid-point of a resistor network so as to pick up the voltage between the metal sheath of the horizontal arm and the antenna. This voltage is set up by the horizontally-polarized component of the signal field. The output of 6 is coupled to the horizontal pickup line by means of transformer 7. Transformers 5 and 7 are designed with ferro-magnetic cores and close coupling to provide sufficient signal energy transfer into their respective transmission lines over a wide range of frequencies.

The heterodyning injection voltage required in the heterodyne direction finder system here employed is supplied from the injection transmission line through transformer 8 to the push-pull suppressor grids 3a and 4a of tubes 3 and 4. This is in contrast with earlier methods in which injection voltage is induced directly into the various collector antennas from a central injection antenna or from diminutive injection loops placed near each collector antenna. The advantage of injection into the suppressor grids 3a and 4a is that interference to nearby receiving installations from this injection voltage field is eliminated. Control grid bias for tubes 3, 4, and 6 is supplied by the bias lead shown connected to an antenna keying commutator 11 which blocks off these tubes, except during those portions of the keying cycle that the particular antenna is to be active. During the time this antenna amplifier is blocked off any transfer of injection voltage to the signal line is undesirable. For this reason, neutralizing condensers 9 and 10 are provided to neutralize coupling due to the suppressor-grid to plate capacitance.

In the upper left portion of Fig. 7 of the drawings it is seen that the signal and horizontal pickup lines from A1, B1 and C1 are connected to receiver 1, shown in Fig. 8, while those from A2, B2 and C2 are connected to receiver 2 in Fig. 8. Bias voltage leads are so connected to antenna keying commutator 11 that A1 and A2 are the only antennas active during part A of the commutating cycle, only B1 and B2 are active during part B, and only C1 and C2 are active during part C. A pilot-signal voltage is applied through the pilot-signal commutator shown at 12A, 13 and 14 to pilot-signal inductors 12. This pilot signal which differs in frequency by approximately 80 C. P. S. from the injection voltage, excites the horizontal arms of each antenna pair longitudinally. Element 12A of the pilot-signal commutator applies pilot signal to the horizontal arm of the particular antenna pair active during each portion of the cycle while elements 13 and 14 apply pilot signal in reverse sense to the arms of the other two pairs.

In receiver 1, Fig. 8, reference character 15 designates the first radio frequency amplifier tube connected to a tuned circuit coupled to the signal input line. The output of amplifier tube 15 is connected to tuned circuit 16 which also receives energy from transformers 17 and 18. Transformer 17 is connected to the output of the main balance-control tubes 19 and 20 which are excited from a tuned circuit connected to the horizontal pickup line. This tuned circuit also excites tube 21 which has a reactive plate circuit and excites the tubes of the quadrature balance-control amplifiers 22 and 23 in phase quadrature with 19 and 20. By application of controlling bias to the balance-control amplifiers, voltage from the horizontal pickup line is controlled in amplitude and phase and mixed with the signal voltage in tuned circuit 16 to balance out unwanted horizontal pickup in the signal line.

The output of circuit 16 excites a conventional second radio frequency amplifier 24 which in turn excites a conventional first detector 25. 26 indicates the main high frequency oscillator of the receiver and 27 designates a buffer amplifier supplying oscillator voltage from 26 to 25. The coupling circuits shown for buffer 27 are designed for response over a wide range of frequencies to eliminate the need for tuning this stage. The intermediate frequency output of 25 is connected to the input of the first intermediate frequency amplifier tube 28. 29 designates the second intermediate frequency amplifier tube. 30 indicates the second detector tube; 31 shows the audio frequency amplifier; and 32 designates the delayed automatic volume control amplifier.

Receiver 2 is identical with receiver 1 except in the arrangement of the high frequency oscillator circuits. 33 and 34 indicate the main-balance control amplifiers; 35 the phase shifting exciter; and 36 and 37 designate the quadrature balance-control amplifiers. 38 designates the first radio frequency amplifier; 39 shows the second radio frequency amplifier; 40 indicates the first detector; 41 shows the first intermediate frequency amplifier; 42 designates the second intermediate frequency amplifier; 43 indicates the second detector; 44 designates the audio frequency amplifier; and 45 shows the delayed automatic volume control amplifier. Oscillator freency voltage from the oscillator in receiver 1 applied to the first detector 40 through the tuned buffer amplifier 46 and to the tuned ffer amplifier 47. The tuned output circuit of supplies oscillator frequency voltage to the jection voltage mixer and to the pilot-signal ixer through the transmission line 48.

In the injection voltage mixer, oscillator fre- ency voltage is applied through the untuned ffer amplifier 49 and tuned buffer amplifier 50 the mixer stage 51. To mixer stage 51 is ap- ied also intermediate frequency voltage from e injection oscillator 52 operating near the nter of the intermediate frequency pass bands the receivers. The heterodyning injection fre- ency voltage in the output of mixer stage 51 is proximately equal to the receiver signal fre- ency and is applied to the injection output am- ifier 135. The tuned output circuit of output plifier 135 is coupled to the injection voltage ansmission line 53 through the injection voltage tenuator 54 shown in Fig. 7. The purpose of is attenuator is to adjust the strength of the in- ction voltage to approximately the same order that of the signal voltage in the outputs of the tenna amplifiers.

In the pilot-signal mixer, 55 and 56 indicate, spectively, the untuned and the tuned oscil- tor frequency buffer amplifiers, 57 indicates e mixer, and 58 designates the output amplifier. e pilot-signal mixer is identical with the in- ction voltage mixer except that the frequency the pilot-signal oscillator 59 is removed from at of the injection oscillator 52 by approximate- 80 C. P. S. The output of the pilot-signal mixer applied through the pilot-signal attenuator 60 own in Fig. 7 and the pilot-signal commutators A, 13 and 14, shown in Fig. 7, to the pilot-signal ductors 12 in the antenna system.

If there is any coupling between the sheath cur- nts in the horizontal arms and the antenna sys- m, the pilot signal will beat with the injection ltage to produce 80 C. P. S. components in the ceiver outputs. The vector difference between e two 80 C. P. S. receiver outputs is indicative the components causing polarization error. e function of the unbalance detector unit is to rive from this 80 C. P. S. unbalanced receiver tput voltage control voltages for actuating the lance-control tubes in the receivers to effect reduction in this undesirable unbalanced out- t. In the unbalance detector unit shown in g. 9, 61 and 62 designate amplifier tubes which ply the 80 C. P. S. difference voltage from the o receivers to the two-stage amplifier 63—64. e output of the amplifier is applied in phase adrature to amplifiers 65 and 66 through phase litting network 67. 68 shows the main un- lance detector consisting of the four diode rec- ier elements shown, and 69 shows the quadra- re unbalance detector. The two unbalance de- tors are supplied with 80 C. P. S. reference ltages obtained by heterodyning the outputs of e injection voltage mixer and the pilot-signal xer in the reference voltage detector unit. ch of the unbalance detectors 68 and 69 thus ctions as a selective analyzer producing D.-C. tput depending, in magnitude and sense, on 80 C. P. S. component applied to its input ich is in phase with the reference voltage. ese D.-C. automatic balance control voltages applied to different filter condensers during three parts of the commutating cycle by ans of control voltage commutators shown at 70 and 71. This permits the use of relatively large filter condensers resulting in stable, well filtered automatic balance control voltages, be- cause each condenser acquires a charge deter- mined by the automatic balance control voltage required during its respective part of the com- mutating cycle and does not need to charge or discharge three times per commutating cycle as would be the case if a single condenser were used.

The reference voltage detector receives its in- put voltages from the two mixer units through delay equalizing networks 72 and 73 shown in Fig. 8. These voltages are applied through buffer amplifiers 74, 75, 76 and 77 to the detector 78 shown in Fig. 8. The 80 C. P. S. output of detector 78 is amplified by tubes 79 and 80 and applied to the adjustable phase delay network 81. The output from network 81 is amplified by tube 82 and applied to the reference voltage input ter- minals of the unbalance detector unit shown in Fig. 9.

The pilot-signal voltage and the injection voltage undergo different amounts of phase shift between the outputs of their respective mixer units and their points of application in the an- tenna system because of various resonant con- ditions in transmission lines and in the hori- zontal feeder sheaths. This would cause a varia- tion with frequency in the phase relation be- tween the 80 C. P. S. receiver outputs and the ref- erence voltage. The delay equalizers 72 and 73 in Fig. 8 are designed to correct this phase varia- tion. The adjustable delay network 81 is pro- vided to permit manual adjustment of this phase relation to supplement the action of equalizers 72 and 73 if required.

The function of the phase meter unit is to de- rive, from the components in the receiver outputs resulting from the beating of the signal with the injection voltage, a D.-C. indicating voltage pro- portional to the component of the vector differ- ence between these two beat notes which is in phase quadrature with their vector sum. These beat notes are applied to the phase meter unit through the parallel "T" networks 83 and 84 shown in Fig. 9, which are designed to eliminate the 80 C. P. S. component. The vector sum volt- age is applied through amplifiers 85 and 86, phase inverter amplifier 87 and push-pull amplifier 88—89 to one pair of input terminals of direc- tional rectifier 90. The vector difference voltage obtained through the use of phase inverter 91 is applied through amplifiers 92 and 93, phase in- verter 94 and push-pull amplifier 95—96 to the other pair of input terminals of directional rec- tifier 90.

The vector sum voltage and the vector differ- ence voltage are shifted in phase ninety electrical degrees with respect to each other by the networks consisting of resistor 136 and capacitor 137 in the sum circuit and capacitor 138 and resistor 139 in the difference circuit.

The D.-C. indicating voltage is applied to the indicating voltage commutator 97 through the sensitivity control 98 either directly or through the neon keyer tubes 99—100 as determined by the selector switch 101. The function of the keyer tubes is effectively to disconnect the phasemeter output circuit in the absence of signal to prevent accumulated charge in the indicating voltage filter condensers 102 to 107 from leaking off through the phasemeter circuit. 108 shows an amplifier which applies audio voltage to the neon tubes 99—100 causing them to ignite and complete the indicating voltage circuit in the presence of signal. It wil be noticed that each of the filter condensers 102 to 107 consists of three separate capacitors selected by a gang-operated switch 109 for adjusting the time constant of the indicating voltage filter. Reference characters 102, 103 and 104 designate the set of three filter condensers normally used. The second set (105, 106 and 107) may be selected optionally by means of switch 110. The purpose of this arrangement is to permit operating with a relatively large time constant when two stations are transmitting on the same channel and bearings are required on both. Selector switch 110 can then be manipulated manually so that each of the two sets of filter condensers integrates the indicating voltage obtained from its respective station.

The indicator unit is shown in Fig. 10 comprising three A.-C. inverter tubes 111, 112 and 113 generating square wave A.-C. voltages proportional to the three D.-C. indicating voltages, $y_a$, $y_b$ and $y_c$, applied to their grids. This is accomplished by the action of the keyer tube 114 which periodically applies blocking bias in the cathode circuits of the three A.-C. inverter tubes. 114 indicates a gas triode characterized by abrupt starting of conduction. 115 shows another gas triode with plate connected to that of 114 and to a common load resistor 115A. 60 cycle per second push-pull A.-C. voltage and D.-C. bias is applied to the grids of 114 and 115 through the transformer shown. The function of triode 115 is to assist in obtaining an abrupt stopping of the conduction through triode 114. The result is that during the period when triode 114 is non-conducting, tubes 111, 112 and 113 operate as conventional amplifier tubes with plates assuming potentials dependent on the D.-C. potentials $y_a$, $y_b$ and $y_c$. Strict linearity in this relation is assured by the use of individual cathode degeneration resistors in these three tubes. When triode 114 is conducting these three tubes are blocked off, their plate currents drop to zero, and their plate potentials quickly rise to the potential of the plate power supply (250 v.); hence an A.-C. potential of square wave form is obtained from the plate of each of these tubes which is proportional to its respective D.-C. grid voltage. These A.-C. potentials are transferred to the remainder of the indicating circuits through blocking condensers 116, 117, 117–A, 118 and 119. Resistors 120, 121, 121–A, 122 and 123 are of comparative high resistance so that the time constants of the series circuits consisting of these resistors and blocking condensers are high compared to the period of the 60 C. P. S. A.-C. wave. The result is that the currents through these resistors are of saw-tooth wave form proportional in amplitude to the square wave A.-C. voltages on the plates of the A.-C. inverter tubes. 124 and 125 indicate phase inverter tubes connected to the resistance networks shown so as to apply to the grid of amplifier 126 a saw-tooth A.-C. voltage proportional to $\sqrt{3}(y_b-y_c)$ and to apply another saw-tooth A.-C. voltage to the grid of tube 127 proportional to $y_b+y_c-2y_a$. These voltages are those given for the denominator and numerator, respectively, of the equation $$\frac{y_b+y_c-2\,y_a}{\sqrt{3}\,(y_b-y_c)}$$

which is equal to the tangent of the indicated azimuth angle. The voltage from tube 126 is applied through amplifier 128 to the horizontally-spaced plates of cathode ray oscilloscope 129, while the voltage from tube 127 is applied through amplifier 130 to the vertically-spaced plates. Individual cathode resistors in amplifier tubes 124, 125, 126, 127, 128 and 130 provide negative feedback to assure linearity in the amplifying characteristics of these tubes. The indication on the oscilloscope screen will thus be a straight line making an angle with the vertical axis equal to the azimuth angle of arrival of the received wave. Reference characters 131 and 132 indicate potentiometers used for centering the image on the oscilloscope screen for easy reading of the azimuth scale. For a sense indication, 60 cycle A.-C. voltage from the same source as that applied to 114 and 115 is applied through phase adjusting network 133 to the grid of gas triode 134. The condenser shown connected between the plate and ground of 134 is thus discharged abruptly once each A.-C. cycle, providing the sudden voltage surge which is applied to one of the grids of oscilloscope 129. This voltage surge will result in a spot on the oscilloscope image different either in focus or intensity from the remainder of the image. Phase adjusting network 133 is adjusted to make this spot appear near one end of the straight line image for the purpose of indicating sense. In the form of the indicator unit shown the output of each A.-C. inverter tube is not strictly proportional to the D.-C. voltage applied to its grid but includes a constant output which is present even when the D.-C. indicating voltage is zero. This does not cause an error in the indicated azimuth angle, however, because it merely changes the value of the arbitrary constant H in the relation $y=H+KX+LX^3$.

For the purpose of more clearly explaining the physical arrangement of the parts of the collecting system and the disposition of the cables leading to the collecting systems, I have shown in enlarged schematic plan view in Fig. 11, the layout of the cables which connect the dipole antennas with the central station; supply commutated energy to the pilot signal line; furnish injection voltage of the suppressor grids of the push pull tube in circuit with the dipoles of each of the collectors; and transmit the horizontal pick-up voltage to the central station apparatus. I have indicated similar reference characters on the enlarged schematic plan view of Fig. 11 to those set forth in Fig. 7. I have added symbols designating each of the parts of the pick-up system. I have shown particularly the commutation cycle at any instance where the pilot signal commutator operates with respect to the pick-up circuit constituted by dipole antennas A1 and A2 in the order 14(B), 13(C), 12A(A), designating the time periods in which the attenuated pilot signal energy is supplied to the pilot signal inductors 12 through the pilot signal commutator shown at 14, 13 and 12A in Fig. 7. The dipole antennas A1 and A2 are rendered active by bias control energy supplied from the antenna keying commutator segment 11a. The order in which dipole antennas B1 and B2 are supplied with inductor voltage under control of the pilot signal commutator is indicated at 14(C), 13(A) and 12A(B). The time period that dipole antennas B1 and B2 are active is represented as controlled by bias potential supplied through the antenna keying commutator connection 11(B).

The time cycle during which the inductor voltage is supplied to dipole antennas C1 and C2 is represented at 14(A), 13(B) and 12A(C). The activation of the circuits supplied from dipole antennas C1 and C2 takes place during the period 11(C) of the antenna keying commutator. The time cycle during which the pairs of dipoles are independently effective upon the central station and the time period during which the pilot signal inductors 12 are effective and the relation thereof will now be fully apparent.

While I have described my invention in one of its preferred embodiments, I realize that modifications and changes may be made and I intend no limitations upon my invention except as may be imposed by the scope of the appended claims.

What I claim as new and desire to secure by Letters Patent of the United States is as follows:

1. In a direction finding system, a three pair directionally disposed antenna arrangement comprising radio frequency energy collecting means, central station apparatus, conductors leading from said central station apparatus to said radio frequency energy collecting means, amplifiers interposed between the ends of said conductors and the radio frequency energy collecting means constituting each of said antenna systems, said amplifiers each including multi-grid balanced electron tube circuits, connections between certain of said grids with said radio frequency energy collecting means, a source of heterodyne injection voltage in said central station apparatus, and means interconnecting said source of heterodyne injection voltage with others of the grids of said balanced amplifier circuits.

2. A direction finding system comprising a plurality of pairs of directionally disposed radio frequency energy collecting systems, a central station apparatus, conductors leading from said radio frequency energy collecting systems, a balanced multi-grid electron tube amplifier circuit connected between each of said radio frequency energy collecting systems and the conductors leading to said central station apparatus, connections between certain of the grids of each balanced electron tube amplifier circuit and the associated radio frequency collecting systems, a source of heterodyne injection voltage in said central station apparatus, connections between said source and others of the grids of said balanced electron tube amplifier circuit, and means for neutralizing capacity coupling between the said grids and other portions of the associated balanced electron tube amplifier circuit.

3. A direction finding system comprising a plurality of pairs of directionally disposed radio frequency energy collecting systems, a multi-grid balanced amplifier located immediately adjacent each of said radio frequency energy collecting systems, a central station including a source of heterodyne injection voltage, conductors extending from said central station to the output circuits of each of said multi-grid balanced amplifiers, certain of the grids of said multi-grid balanced amplifiers being connected with the associated radio frequency energy collecting systems and others of said grids being connected through conductors leading to said central station with said source of heterodyne injection voltage, and means for controlling the time periods over which the balanced amplifier associated with a particular radio frequency energy collecting system is operative.

4. A direction finding system comprising a central station, pairs of conductor sheaths extending radially from said central station, radio frequency energy collecting means located adjacent the ends of said conductor sheaths, multi-grid balanced amplifier systems having certain of the grids thereof connected with the radio frequency energy collecting means adjacent the ends of said conductor sheaths, conductors extending from the output circuit of each of said multi-grid balanced amplifier systems to said central station, a heterodyne injection voltage generator located at said central station and connected to conductors extending through said conductor sheaths with others of the grids of said multi-grid amplifier systems, a pilot signal conductor extending adjacent each of said conductor sheaths, means for emitting radio frequency energy from the ends of said pilot signal conductor in the area around said conductor sheaths, and means for timing the excitation of said pilot signal conductor and the period over which the balanced amplifier system associated with a particular radio frequency energy collecting means is operative.

5. A direction finding system comprising a central station, pairs of conductor sheaths extending radially from said central station, radio frequency energy collecting means located adjacent the ends of said conductor sheaths, multi-grid balanced amplifier systems having certain of the grids thereof connected with the radio frequency energy collecting means adjacent the ends of said conductor sheaths, conductors extending from the output circuit of each of said multi-grid balanced amplifier systems to said central station, a heterodyne injection voltage generator located at said central station and connected to conductors extending through said conductor sheaths with others of the grids of said multi-grid amplifier systems, a pilot signal conductor extending adjacent each of said conductor sheaths, means for emitting radio frequency energy from the ends of said pilot signal conductor in the area around said conductor sheaths, a horizontal pick-up amplifier connected with the associated balanced amplifier system, means connected with said amplifier for transmitting horizontal pick-up energy to said central station, and means for timing the excitation of said pilot signal conductor and the period over which the balanced amplifier system associated with a particular radio frequency energy collecting means is operative.

6. A direction finding system comprising a central station, pairs of conductor sheaths extending radially from said central station, radio frequency energy collecting means located adjacent the ends of said conductor sheaths, multi-grid balanced amplifier systems having certain of the grids thereof connected with the radio frequency energy collecting means adjacent the ends of said conductor sheaths, conductors extending from the output circuit of each of said multi-grid balanced amplifier systems to said central station, a heterodyne injection voltage generator located at said central station and connected to conductors extending through said conductor sheaths with others of the grids of said multi-grid amplifier systems, a pilot signal conductor extending adjacent each of said conductor sheaths, means for emitting radio frequency energy from the ends of said pilot signal conductor in the area around said conductor sheaths, a horizontal pick-up amplifier having its input circuit connected with the input circuit of the associated balanced amplifier system and with said radio frequency energy collecting means and having its output circuit connected through a horizontal pick-up line with said central station, and means for timing the excitation of said pilot signal conductor and the potential applied to both said horizontal pick-up amplifier and the associated balanced amplifier system.

7. A direction finding system comprising a central station, pairs of conductor sheaths extending radially from said central station, radio frequency energy collecting means located adjacent the ends of said conductor sheaths, multi-grid balanced amplifier systems having certain of the grids thereof connected with the radio frequency energy collecting means adjacent the ends of said conductor sheaths, conductors extending from the output circuit of each of said multi-grid balanced amplifier systems to said central station, a heterodyne injection voltage generator located at said central station and connected to conductors extending through said conductor sheaths with others of the grids of said multi-grid amplifier systems, a pilot signal conductor extending adjacent each of said conductor sheaths, means for emitting radio frequency energy from the ends of said pilot signal conductor in the area around said conductor sheaths, a signal line conductor extending through said conductor sheaths for transmitting signal energy to said central station, a horizontal pick-up amplifier associated with each balanced amplifier system, a horizontal pick-up line extending through said conductor sheath from the output of said horizontal pick-up amplifier to said central station, a bias potential control conductor extending through said conductor sheaths from said central station apparatus to both said horizontal pick-up amplifier and said balanced amplifier system, and means for timing the period over which the balanced amplifier system associated with a particular radio frequency energy collecting means is operative and timing the application of bias potential to both said horizontal pick-up amplifier and said balanced amplifier system.

8. In a direction finding system, a three pair antenna directionally disposed arrangement comprising radio frequency energy collecting means, a two channel signal receiving system, conductors subject to unwanted horizontal pick-up energy establishing connections between said radio frequency energy collecting means and the input circuits of said two channel signal receiving system, a visual indicator operated by the conjoint output of said signal receiving channels, and means controlled by the energy received from said radio frequency energy collecting means for balancing out unwanted horizontal pick-up energy in the conductors which interconnect said radio frequency energy collecting means with said signal receiving channels.

9. In a direction finding system, a three pair directionally disposed antenna arrangement comprising radio frequency energy collecting means, a pair of signal receiving channels, conductors exposed to unwanted horizontal pick-up energy interconnecting said radio frequency energy collecting means and said pair of signal receiving channels, a visual indicator operated by the integrated output of said signal receiving channels, commutating means for rendering said radio frequency energy collecting means selectively effective with respect to said signal receiving channels, and means controlled by the energy received by said radio frequency energy collecting means for balancing out unwanted horizontal pick-up energy in the said conductors.

10. In a direction finding system, a three pair directionally disposed antenna arrangement comprising radio frequency energy collecting means, a pair of signal receiving channels, conductor sheaths extending between said radio frequency energy collecting means and said signal receiving channels, conductors extending through said conductor sheath and establishing connection between said radio frequency energy collecting means and said signal receiving channels, visual indicator means for integrating the output energy from both of said signal receiving channels, unbalance detector means connected with the output of said signal receiving channels, and commutating means for successively controlling the effect of said radio frequency energy collecting means upon said signal receiving channels, and means controlled by said unbalance detector means for balancing out horizontal pick-up energy incident upon said conductor sheaths and said conductors.

11. In a direction finding system, a three pair directionally disposed antenna arrangement comprising radio frequency energy collecting means, a two channel signal receiving circuit, a visual indicating system, and circuits for rendering effective on said visual indicating system the integrated effects of energy incident upon said three pair antenna arrangement through said two channel signal receiving circuit.

12. In a direction finding system, a three pair directionally disposed antenna arrangement, a two channel signal receiving circuit connected with said three pair antenna arrangement, a visual indicator including a cathode ray tube having cathode ray indicating means therein, and three control circuits for operating said cathode ray tube from the output of said two channel signal receiving circuit in accordance with energy collected by said three pair antenna arrangement.

13. In a direction finding system, a three pair directionally disposed antenna arrangement, a two channel signal receiving circuit connected with said three pair antenna arrangement, a visual indicator including a cathode ray tube having cathode ray indicating means therein, three control circuits for operating said cathode ray tube from the output of said two channel signal receiving circuit in accordance with energy collected by said three pair antenna arrangement, and commutating means for successively rendering the individual pairs of said three pair antenna arrangement effective upon said two channel signal receiving circuit.

14. In a direction finding system, a three pair directionally disposed antenna arrangement comprising radio frequency energy collecting means, a multi-grid balanced electron tube amplifier having the input circuits thereof connected with said radio frequency energy collecting means, conductors extending from the output circuits of said balanced electron tube amplifiers, a pair of signal receiving channels having their input circuits connected with said conductors, a conductor sheath enclosing said conductors, a visual indicator operative by the combined effects of output currents delivered by said pair of signal receiving channels, means for introducing a heterodyne injection voltage into the grids of each of said multi-grid balanced amplifiers, means for introducing a pilot signal voltage to the said sheaths for transmission to said pair of signal receiving channels, and means for timing the periods of application of said pilot signal voltage.

15. In a direction finding system employing a three pair directionally disposed antenna arrangement, each coupled through balanced amplifier systems with a two channel signalling system having the output thereof connected in common to a visual indicator circuit, means for integrating the effects of signalling energy received by the three pair antenna arrangement, means for transmitting to each of the balanced amplifier systems commutated bias energy for successively rendering the pairs of antenna arrangements effective upon the signal receiving channels, three sets of integrating condensers, and means for connecting the three sets of integrating condensers to the visual indicator circuit in synchronism with the commutation of said bias energy.

16. In a direction finding system employing a three pair directionally disposed antenna arrangement, each coupled through balanced amplifier systems and sheathed conductors with a two channel signalling system having the output thereof connected in common to a visual indicator circuit, means for integrating the effects of signalling energy received by the three pair antenna arrangement, means for transmitting to each of the balanced amplifier systems commutated bias energy for successively rendering the pairs of antenna arrangements effective upon the signal receiving channels, three sets of integrating condensers, a generator of alternating current, means for transmitting the alternating current to the balanced amplifier systems, means for transmitting alternating current of a frequency different from the frequency of the aforementioned alternating current for establishing a pilot signal field about the sheaths enclosing the conductors that extend between the balanced amplifier systems and the signal receiving channels, and means for connecting said three sets of integrating condensers to said visual indicator circuit in synchronism with the commutation of said bias energy.

17. In a direction finding system which includes a three pair directionally disposed antenna arrangement constituted by radio frequency energy collecting means connected through balanced amplifiers and sheathed conductors with a two channel signal receiving system having the outputs of the two channel signal receiving system integrally connected with a visual indicator, the method of balancing out unwanted horizontal pick-up energy which comprises electronically rendering the antenna arrangements successively effective to impress signalling energy upon said signal receiving channels, differentially controlling the impression of a pilot signal alternating current field around the sheathed conductors and controlling the relative time periods of effective impression of the pilot signal voltage with respect to the periods of energization of the pairs of antenna arrangements.

18. In a direction finding system, a three pair directionally disposed collector arrangement, each collector arrangement being connected through a balanced amplifier system and sheathed conductor with a receiving system, a pilot signal system including means for impressing a pilot signal upon said sheathed conductor, separate amplifier means connected with said collector arrangements and connected with said receiving system for impressing signal energy, and incidental horizontal pick-up energy induced in said sheathed conductor, upon said receiving system, an unbalance detector in said receiving system for detecting the presence of pilot signal energy, and means controlled thereby for controlling the application of horizontal pick-up energy to the input circuits of the signal receiving system for balancing out unwanted currents while effectively receiving the signal energy.

WALTER H. WIRKLER.